United States Patent [19]
Chang

[11] Patent Number: 5,813,740
[45] Date of Patent: Sep. 29, 1998

[54] COMPACT DISK STORAGE TOWER ASSOCIATED WITH A COMPUTER CASE

[76] Inventor: I-Chen Chang, 2F, No. 4, Maan-Pyng St., Pan-Chyau Shih,Taipei Hsien, Taiwan

[21] Appl. No.: 823,135

[22] Filed: Mar. 25, 1997

[51] Int. Cl.⁶ .................................................. A47B 81/06
[52] U.S. Cl. ....................... 312/223.2; 312/9.46; 361/683
[58] Field of Search ................................ 312/223.2, 9.45, 312/9.46, 9.58; 361/683, 724, 727

[56] References Cited

U.S. PATENT DOCUMENTS

| | | | |
|---|---|---|---|
| 1,101,623 | 6/1914 | Evans et al. | 312/9.46 |
| 5,090,783 | 2/1992 | Chimner | 312/9.46 |
| 5,531,516 | 7/1996 | Peng | 312/9.46 |
| 5,549,375 | 8/1996 | Pagliaccio | 312/223.2 |
| 5,697,684 | 12/1997 | Gyovai | 312/9.46 |

*Primary Examiner*—Peter M. Cuomo
*Assistant Examiner*—Gerald A. Anderson

[57] ABSTRACT

The present invention discloses a compact disk storage tower structure that is associated with a front panel of a computer case to provide convenience in the retrieval of compact disks. The front panel according to the invention includes an opening of which the peripheral rims are equipped with barbed fingers on the back side of the panel to hold a housing in position. The housing has a wide open front, a plurality of curved ledges formed on the internal side walls, a pin hole located away from the ledges and extending from the top of the housing to the bottom, engaging openings well-balancedly provided on exterior walls thereof, and an upper and a lower groove integrally molded to serve as a receptacle for a speaker. The housing accommodates a plurality of compact disk trays each of which has a stepped flange with a holed protrusion on one side end and a thin flexible flat slab angularly extending from the peripheral surface. The compact disk trays are piled up and attached to the housing by individually driving fastening elements into the pin hole through the hole of the protrusion from the top of the housing to the bottom. These trays are locked in position by an engagement of the curved ledge with the thin flexible flat slab.

5 Claims, 7 Drawing Sheets

COMPACT DISK STORAGE TOWER ASSOCIATED WITH A COMPUTER CASE

BACKGROUND OF THE INVENTION

The present invention relates to a compact disk storage tower associated with a front panel of a computer case, especially to a compact disk storage tower structure that provides room for the storage of compact disks and that can provide convenience in use and can be arranged inside the computer case in different direction.

Along with the advance of computer technologies, the personal computers most widely used have changed from those with an 80386 CPU or 80486 CPU to those using a Pentium CPU and multimedia personal computers. As to other peripheral equipment, a trend of using a compact disk player as a data retrieval device is formed. The compact disk player confers the personal computers a feature of playing music and movies on a computer screen.

Through the compact disk player reading data, a massive data base can be easily built and retrieved due to the bulky storage space of compact disks. People have gradually adopted compact disks as one of their data storage media. However, due to the precision and the vulnerableness of compact disks, the preservation and storage is an important consideration to users. Although there are currently many kinds of compact disk storage devices on the market they are mostly individual boxes and their design is suitable for the storage of audio compact disks, not for those used in a personal computer. Thus it is desirable to have a storage structure that saves space and provides convenience in use for computer used compact disks.

Accordingly the primary object of the invention is to provide a compact disk storage tower that can provide convenience in retrieval of compact disks and that consists of a front panel of a computer case, a housing, a plurality of compact disk trays, and two fastening elements;

the front panel including an opening of which the peripheral rims are equipped with barbed fingers on the back side of the panel;

the housing having a wide open front, a plurality of curved ledges formed on the internal side walls, a pin hole located away from the ledges and extending from the top of the housing to the bottom, low raised posts disposed on the bottom of the housing to reduce friction between the housing and compact disk trays when the trays rotate, engaging openings well-balancedly provided on exterior walls thereof, and an upper and a lower groove integrally molded to secure a speaker therein;

a plurality of compact disk trays each of which has a stepped flange with a holed protrusion on one end and a thin flexible flat slab angularly extending from the peripheral surface; and two fastening elements passing through the pin hole respectively from the top of the housing to the bottom.

The above-mentioned parts are assembled in a way in which the housing is fixed in the opening of the front panel by barbed fingers and each compact disk tray is locked in place by an engagement of the curved ledge with the thin flexible flat slab.

Another object of the invention is to provide a compact disk storage tower associated with a front panel of a computer case in which each compact disk tray is provided with an angularly extending flexible slab. Users can easily pull the end of a slab to draw out a compact disk tray.

BRIEF DESCRIPTION OF ACCOMPANYING DRAWINGS

The major features and novelty of the invention will be become apparent from the following detailed description of preferred embodiments when read in conjunction with the accompanying drawings, in which.

DESCRIPTION OF PREFERRED EMBODIMENTS

Figure 1:
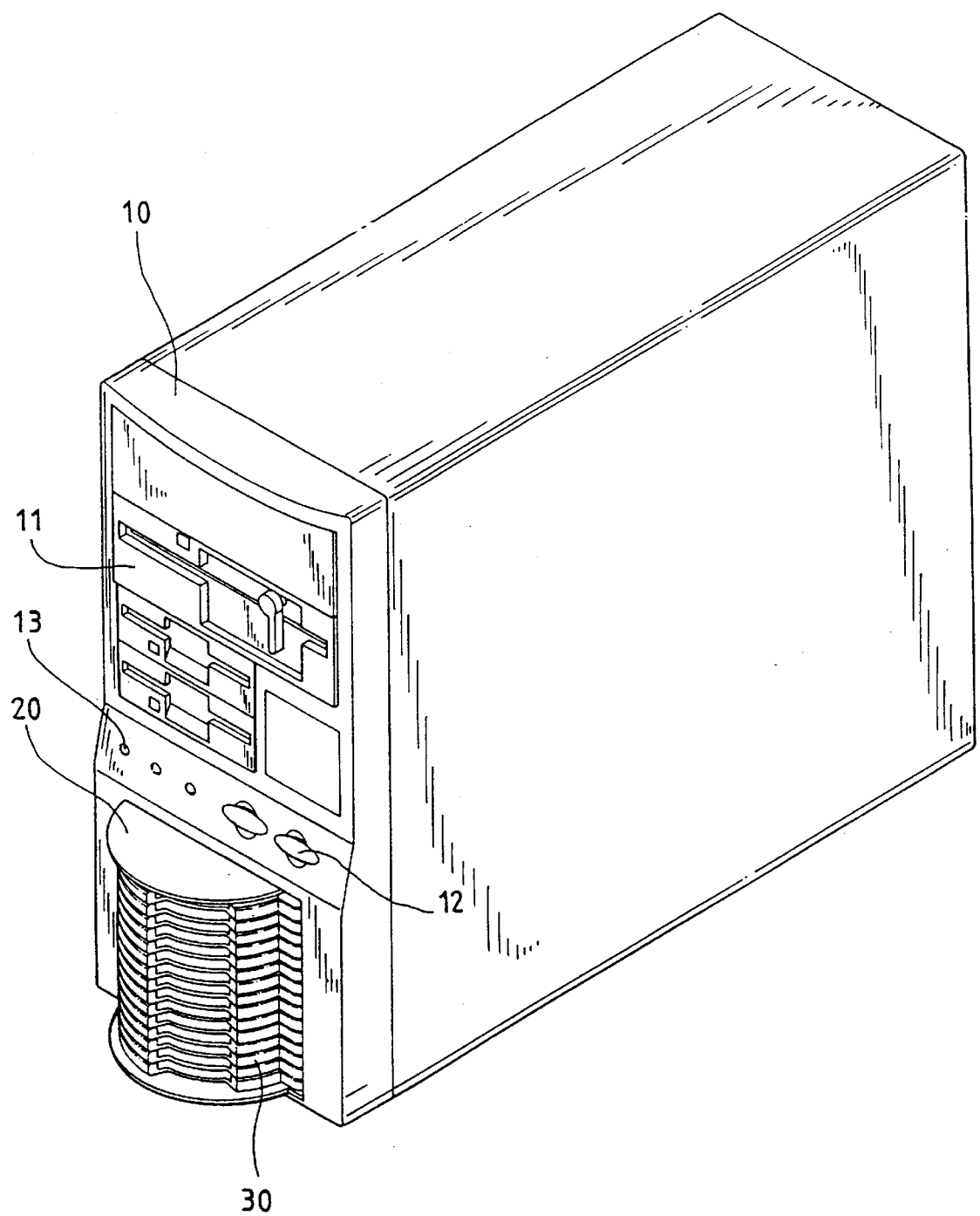
FIG. 1 illustrates the practice of the invention.
Figure 2:
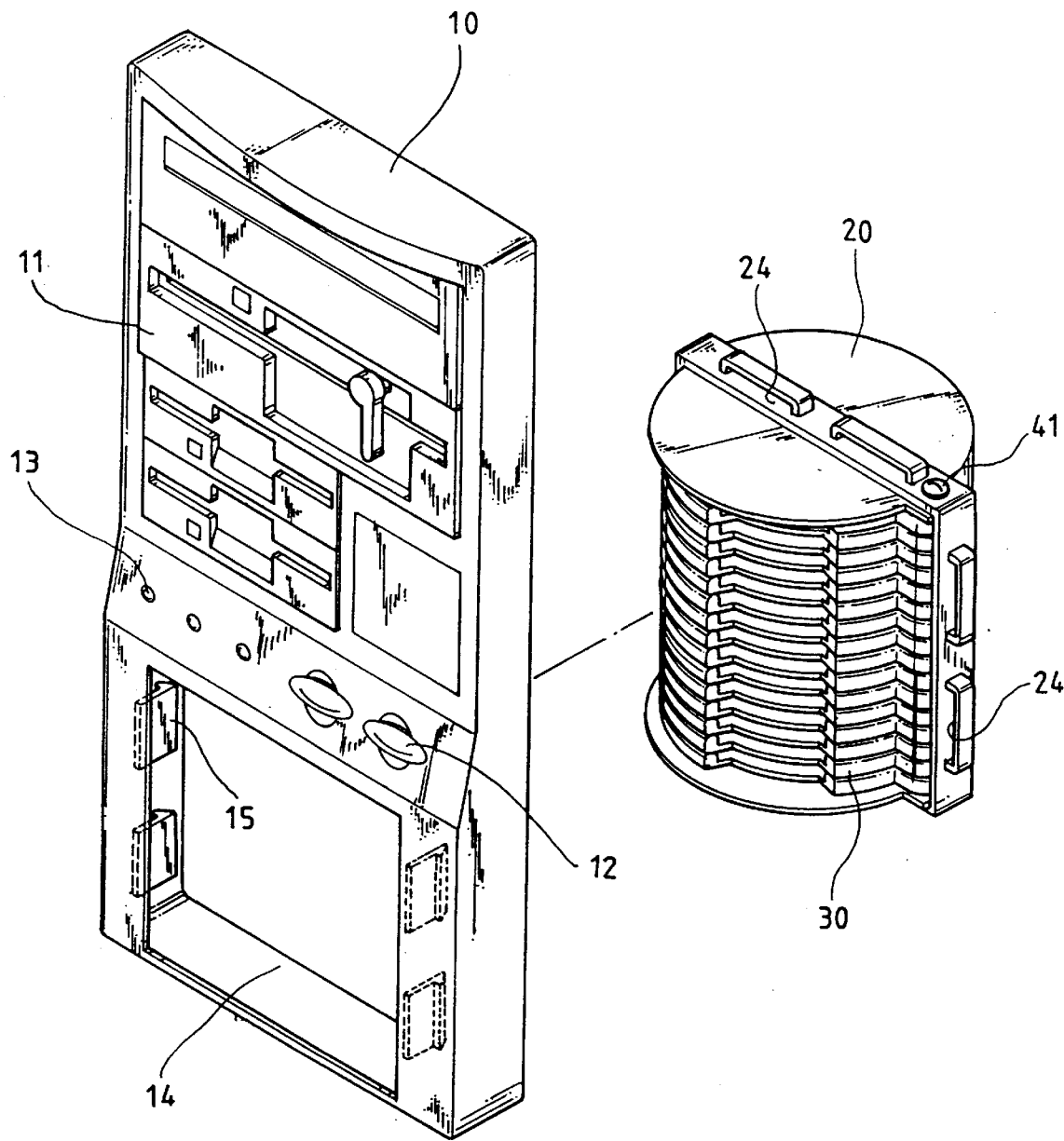
FIG. 2 is an exploded view showing the assembly of a front panel of a personal computer with a compact disk tower storage according to the invention.

With reference to FIGS. 1 through 4, a compact disk storage tower according to the invention generally comprises a front panel 10 of a computer, a housing 20, a plurality of compact disk trays 30, and two fastening elements 41, 42.

Other than a floppy disk driver slot 11, functional buttons 12, and indicator lights 13, the front panel 10 of a computer also includes an opening 14 that has barbed fingers 15 symmetrically arranged on opposite sides, either on upper and lower edges or on the left and right thereof.

The housing 20 contains a wide open front and a plurality of projecting curved ledges 21 formed on the internal walls near the front face thereof. A pin hole 22 extending through the top and bottom faces of the housing 20 is disposed away from the projecting ledges 21. Provided on the bottom of the housing 20 is low raised posts 23 that can reduce the friction forces against the movement of the compact disk trays when the trays rotate. The exterior walls of the housing 20 are well-balancedly provided with engagement openings 24 and integrally molded with the upper and lower grooves 25 and 26 that serve as a receptacle for receiving a speaker.

Figure 3:
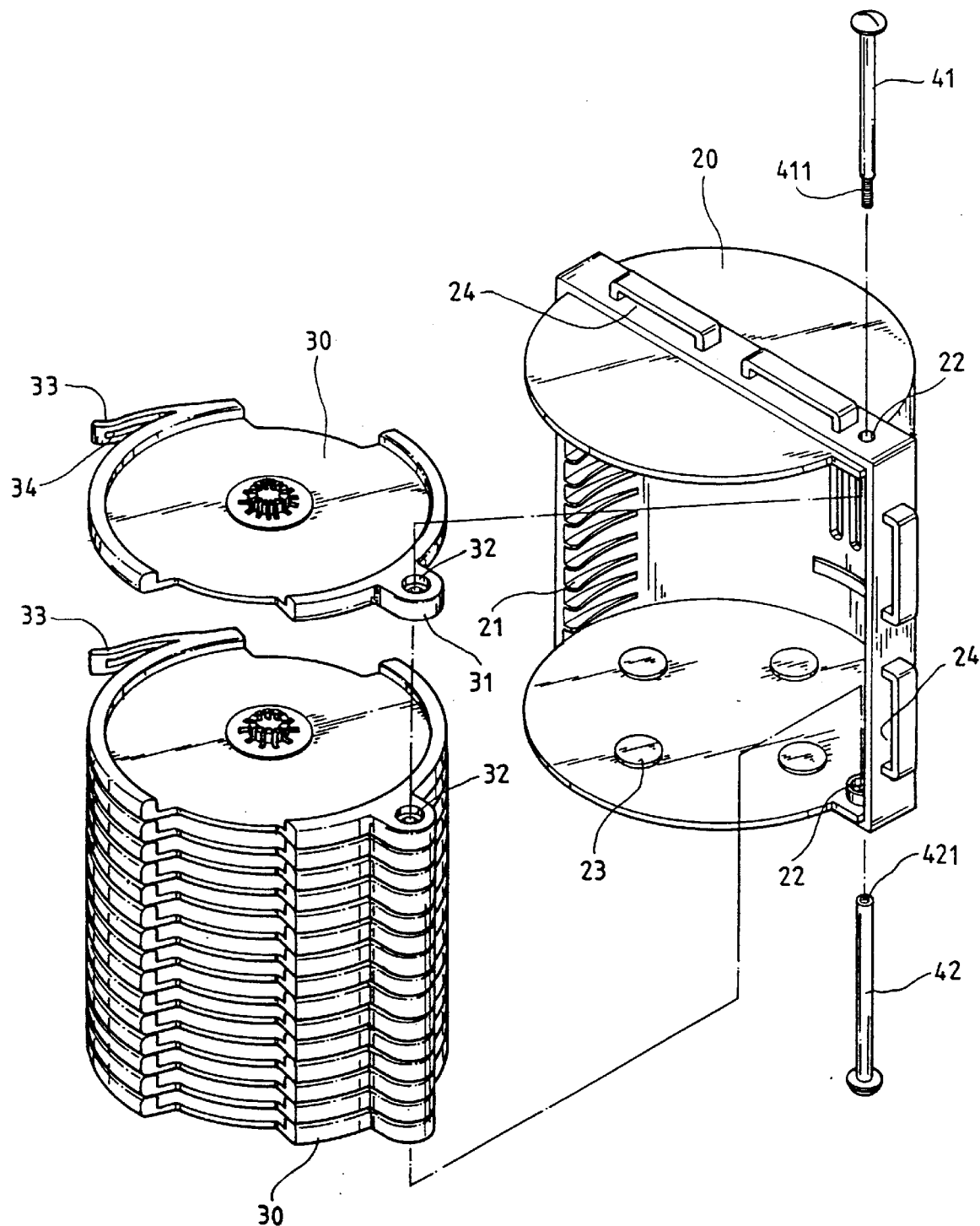
FIG. 3 is an exploded view depicting the components of a compact disk storage tower according to the invention.
Figure 4:
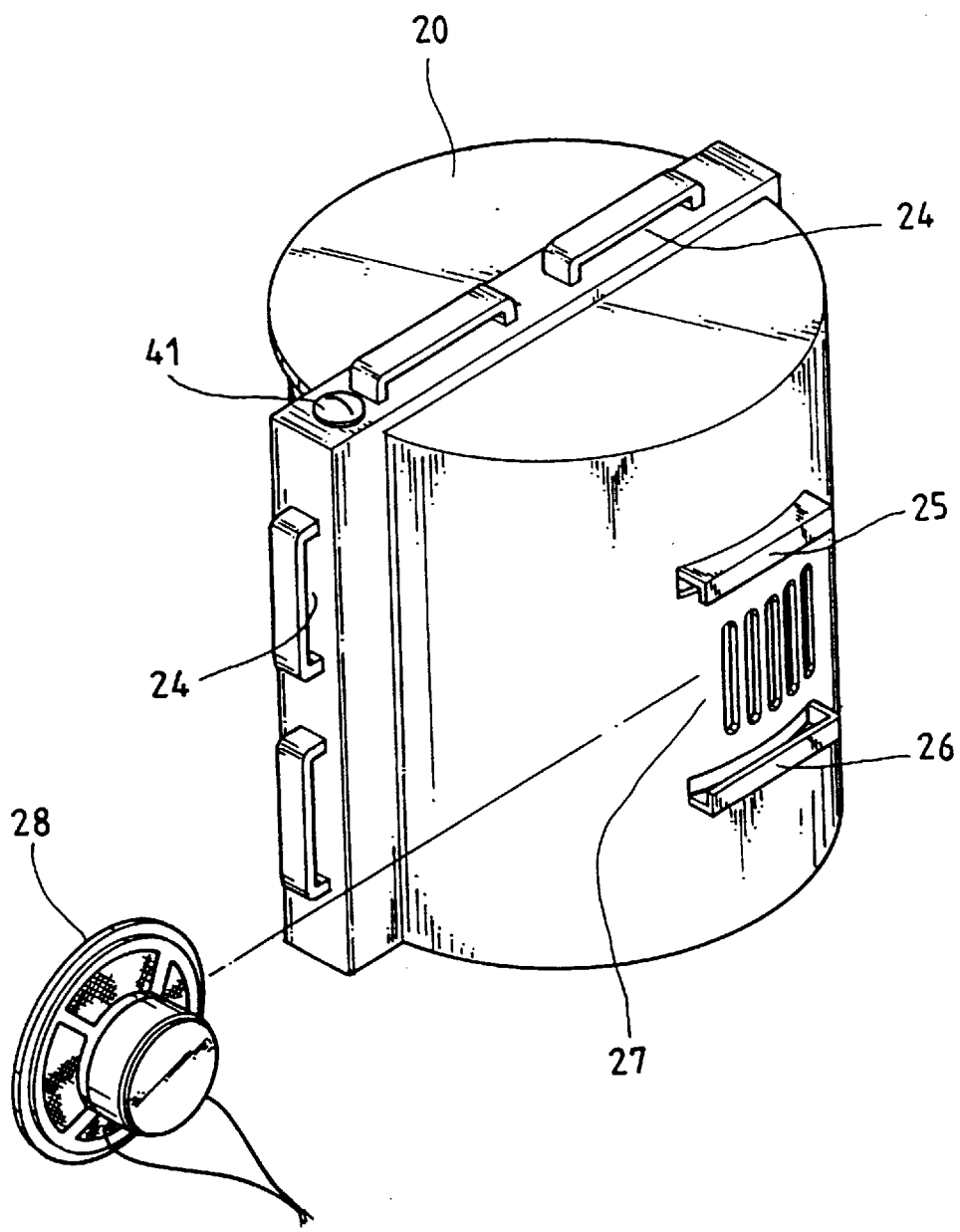
FIG. 4 is a rear view of the housing of a compact disk storage tower according to the invention.
Figure 5:
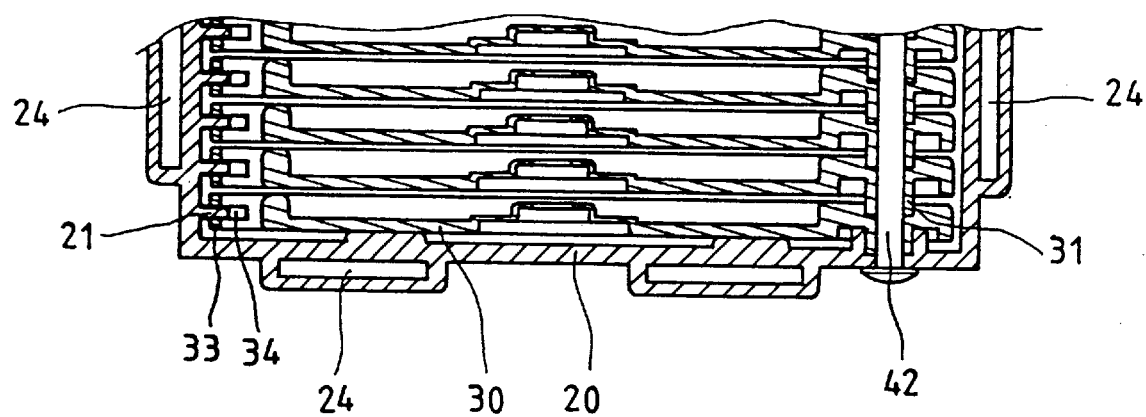
FIG. 5 is a cross sectional view partially showing the internal structure of a compact disk storage tower of the invention in an assembled state.

Referring to FIGS. 3 and 5, each of compact disk trays 30 has a stepped flange 31 with a protrusion on one end. The protrusion comprises a hole 32. Each compact disk tray 30 is further furnished with a flexible flat slab 33 angularly extending from one side of the tray. The flexible flat slab 33 is provided with a bottomless slot 34.

Two fastening elements 41 and 42 are respectively a round rod with a wide head. The fastening element 41 is provided with male threads 411 on its end and the other element 42 has female threads 421 on the end. These two fastening elements extend into the pin hole 22 of the housing 20 individually from the top and the bottom to engage with each other.

Figure 7:
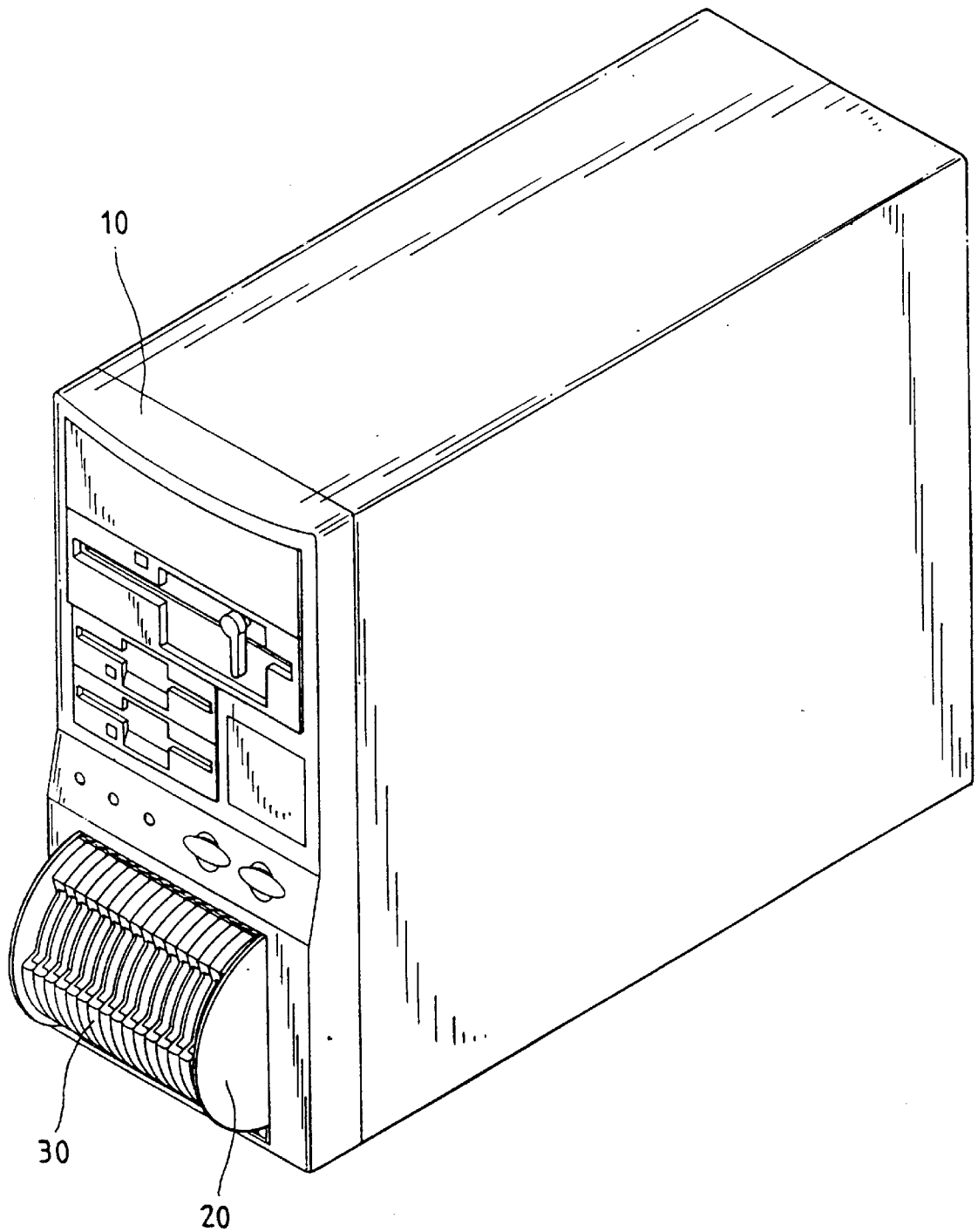
FIG. 7 shows another example of the practice of a compact disk storage tower according to the invention.

In assemblage, the compact disk trays 30 are piled by laying the stepped flanges 31 one upon another to form a multiply-layer storage rack. The storage rack is further placed into the housing 20 where two fastening elements 41 and 42 separately extend into the pin hole 22 from the top and the bottom of the housing, serially joining compact disk trays 30 together by passing the fastening element 41 or 42 through the hole 32 of each tray. The elements 41 and 42 are connected to each other by the engagement between the male and female threads 421 and 411. Thus it shows no joining seam in the outer appearance. The compact disk tray 30, after being incorporated into a storage rack, is locked in position by extending a projecting ledge 21 into the slot 34 of the flexible flat slab 33. As the tray is seated inside the housing, the extending end of the flexible slab sticks out of the housing as shown in FIG. 7. Thus when a user wants to take out a compact disk from the storage tower, he or she can easily depress the exposed end of the flexible slab 33 in order to turn the tray out of the housing.

FIG. 7 shows another embodiment of a compact disk storage tower of the invention. In this case, the housing can be merged with a computer case in a different direction, depending on users' preference. Therefore the storage tower structure of the invention has great adaptability, further promoting its practical value.

Figure 6:
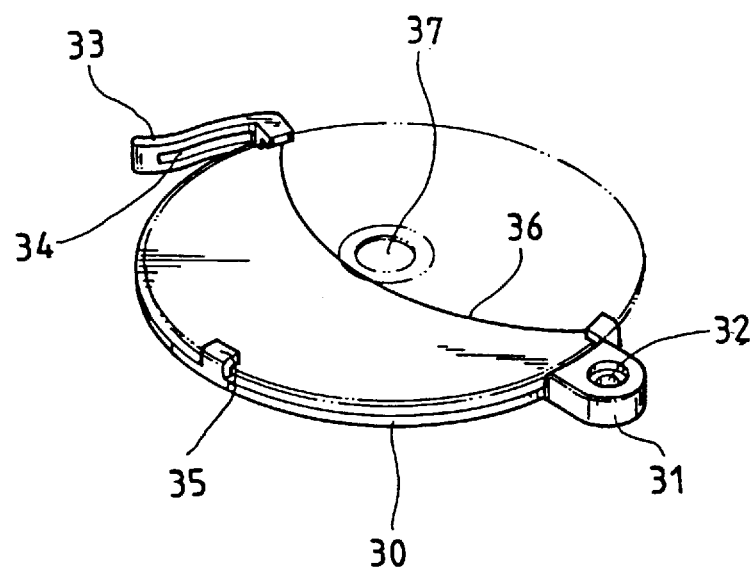
FIG. 6 is a schematic view showing the outer appearance of another embodiment of a compact disk tray according to the invention.

As shown in FIG. 6, another embodiment of a compact disk tray 30 according to the invention is configured to be a half-moon shaped plate that has at least three locating fingers 35 equiangularly distributed along the periphery. The locating finger upwardly extends from the edge of the tray for a short distance and then continues to stretching toward the center to form a claw-shaped portion. The tray can keep a compact disk centered by means of at least three locating fingers. Besides, the curve line 36 on the top surface of a half-moon shaped plate is arranged outside the area of the hole 37 in order that users can put their finger into the hole 37 with ease to take out a compact disk.

From the above description, a compact disk storage tower according to the invention pivotally incorporates compact disk trays by means of two fastening elements, each of which trays uses a flexible flat slab to fix itself in place and can be drawn out from the storage tower by pulling the end of the flexible flat slab. Thus the storage device according to the invention provides convenience in the retrieval of compact disks. Such combination of a compact disk storage tower with a computer case has never been known before. It has the following significant benefit: an aesthetic outer appearance of a computer case, an easy-to-retrieve arrangement of compact disks, saving money for a computer user in buying extra storage devices, and allowing more space for the use of other peripheral equipment. It indeed is valuable in the industry.

What is claimed is:

1. A compact disk storage tower associated with a front panel of a computer case comprising:

a front panel of a computer case including an opening and opening peripheral rims with barbed fingers on the back side of a panel;

a housing having a wide open front, a plurality of curved ledges formed on a internal side walls, a pin hole located away from said ledges and extending from the top of said housing to the bottom, low raised posts disposed on the bottom of said housing to reduce friction engaging openings, and an upper and a lower groove integrally molded on exterior walls of said housing;

a plurality of compact disk trays each of which has a stepped flange with a holed protrusion on one end and a thin flexible flat slab angularly extending from a peripheral surface; and two fastening elements passing through said pin hole respectively from the top of said housing to the bottom; and characterized in that said housing is fixed in the opening of said front panel by barbed fingers and said compact disk trays are stacked pivotally joined together by said fastening elements passing through the holed protrusion of each tray, is secured in the housing by said curved ledge retaining the thin flexible flat slab.

2. A compact disk storage tower associated with a front panel of a computer case as claimed in claim 1 wherein said barbed fingers formed on the back face of the front panel along the peripheral edges are symmetrically distributed.

3. A compact disk storage tower associated with a front panel of a computer case as claimed in claim 1 wherein said upper and lower grooves integrally molded on the rear exterior wall of the housing serve to hold a speaker.

4. A compact disk storage tower associated with a front panel of a computer case as claimed in claim 1 wherein formed on the flexible flat slab of said compact disk tray is a slot that engages with one of said curved ledges to retain the compact disk tray.

5. A compact disk storage tower associated with a front panel of a computer case as claimed in claim 1 wherein said compact disk configured to be a half-moon shaped plate with the curved outlines outside a central area of the tray to allow users to put their fingers into the hole of a compact disk and has at least three locating fingers equiangularly distributed along the periphery of said tray.

* * * * *